US011295781B1

(12) United States Patent
Liu et al.

(10) Patent No.: US 11,295,781 B1
(45) Date of Patent: Apr. 5, 2022

(54) DATA STORAGE DEVICE SORTING ACCESS COMMANDS BASED ON CURRENT OR TARGET LOCATION OF HEADS

(71) Applicant: Western Digital Technologies, Inc., San Jose, CA (US)

(72) Inventors: Kexiu Liu, Foothill Ranch, CA (US); David R. Hall, Rochester, MN (US); Kuang Yang Tu, Irvine, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/346,699

(22) Filed: Jun. 14, 2021

(51) Int. Cl.
*G11B 5/54* (2006.01)
*G11B 21/08* (2006.01)
*G11B 5/012* (2006.01)

(52) U.S. Cl.
CPC .............. *G11B 21/08* (2013.01); *G11B 5/012* (2013.01)

(58) Field of Classification Search
CPC ..... G11B 5/5547; G11B 5/54; G11B 5/59633; G11B 5/59638; G11B 15/005; G11B 15/087; G06F 3/0625; G06F 3/0659

USPC ........................................................ 360/75
See application file for complete search history.

(56) References Cited

U.S. PATENT DOCUMENTS

| 10,014,018 | B1 | 7/2018 | Kiyonaga et al. |
| 10,839,839 | B1 | 11/2020 | Uchida et al. |
| 10,872,629 | B2 | 12/2020 | Hall |
| 10,930,310 | B1 | 2/2021 | Uchida et al. |

FOREIGN PATENT DOCUMENTS

JP      2002230795    *   8/2000   ............... G11B 5/00

* cited by examiner

*Primary Examiner* — Nabil Z Hindi
(74) *Attorney, Agent, or Firm* — Patterson & Sheridan, LLP; Steven H. Versteeg

(57) ABSTRACT

A data storage device is disclosed comprising a first plurality of heads actuated over a first subset of disk surfaces by a first actuator, and a second plurality of heads actuated over a second subset of disk surfaces by a second actuator. A plurality of access commands is received, wherein each access command is associated with one of the heads. A scalar is configured for each access command based on at least one of a current radial location of the corresponding head or a target radial location of the corresponding head associated with executing the access command. The access commands are sorted based on the scalars, and one of the access commands is selected for execution based on the sort.

20 Claims, 4 Drawing Sheets

DATA STORAGE DEVICE SORTING ACCESS COMMANDS BASED ON CURRENT OR TARGET LOCATION OF HEADS

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

A disk drive typically comprises a plurality of disks each having a top and bottom surface accessed by a respective head. That is, the VCM typically rotates a number of actuator arms about a pivot in order to simultaneously position a number of heads over respective disk surfaces based on servo data recorded on each disk surface. FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figure 2A:
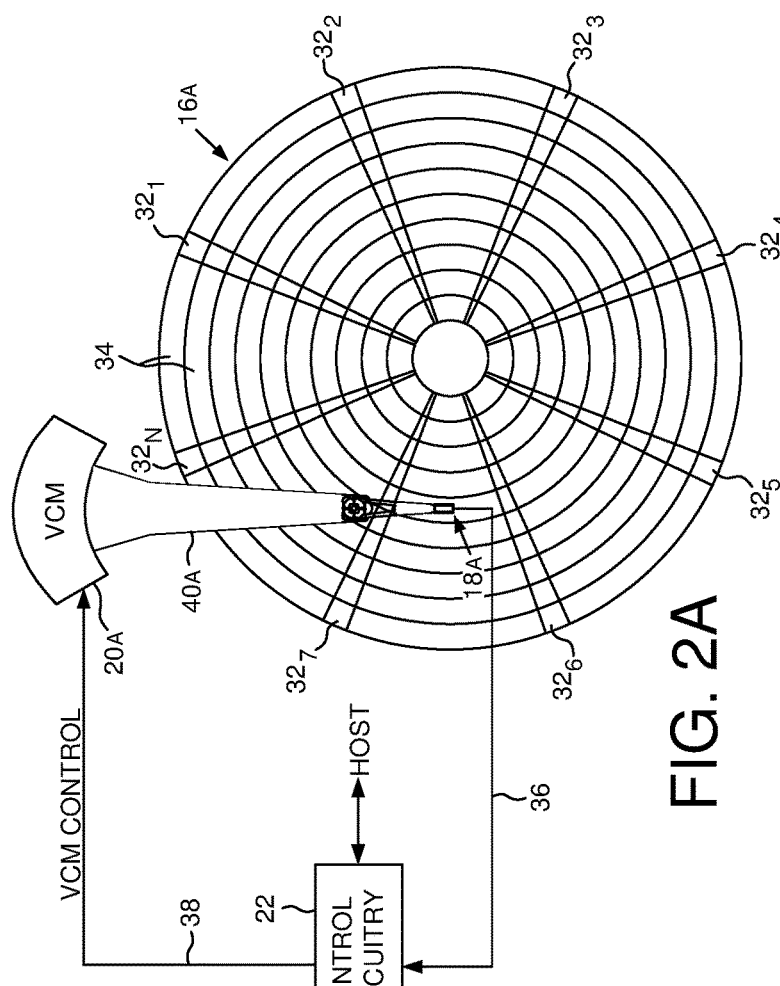
FIG. 2A shows a data storage device in the form of a disk drive according to an embodiment comprising a head actuated over a disk surface.
Figure 2B:
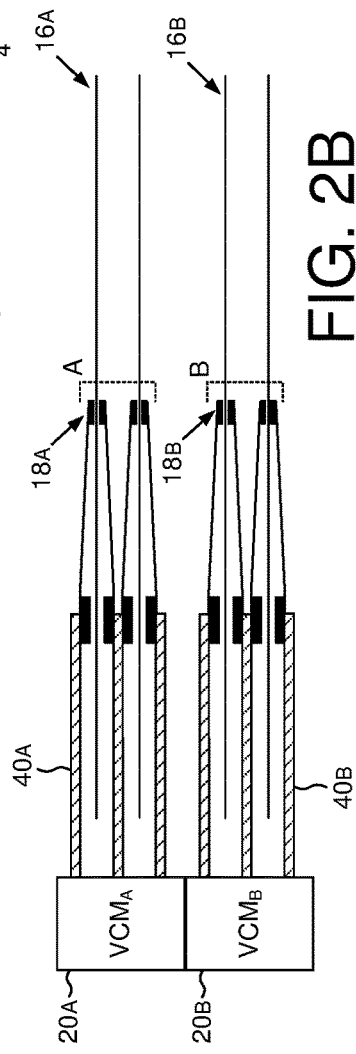
FIG. 2B shows an embodiment wherein the disk drive comprises a split actuator comprising a first VCM actuating a first subset of actuator arms and a second VCM actuating a second subset of actuator arms about a common pivot.
Figure 2C:
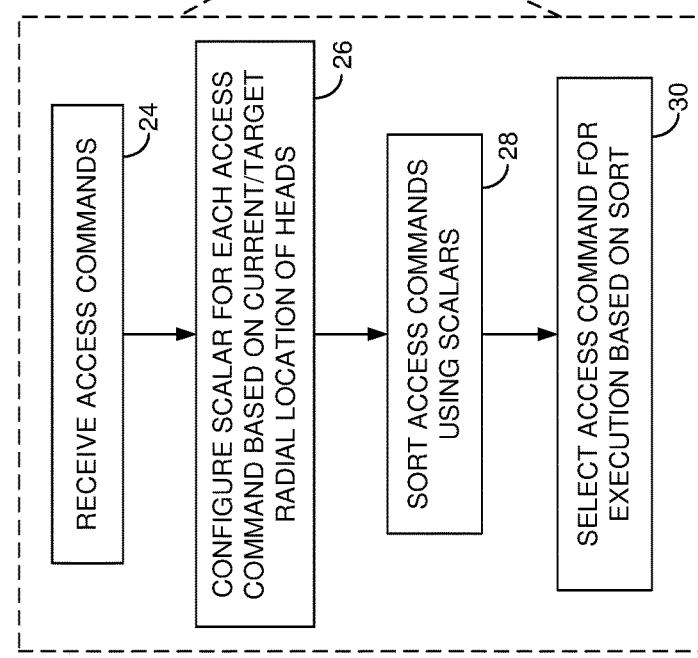
FIG. 2C is a flow diagram according to an embodiment wherein access commands are sorted into an execution order based on at least one of the current or target radial location of the corresponding head.

FIGS. 2A and 2B show a data storage device in the form of a disk drive according to an embodiment comprising a plurality of disk surfaces (e.g., 16A and 16B). A first plurality of heads (e.g., 18A) are actuated over a first subset of the disk surfaces (e.g., 16A) by a first actuator (e.g., 20A), and a second plurality of heads (e.g., 18B) are actuated over a second subset of the disk surfaces (e.g., 16B) by a second actuator (e.g., 20B). The disk drive further comprises control circuitry 22 configured to execute the flow diagram of FIG. 2C, wherein a plurality of access commands are received each associated with one of the heads (block 24). A scalar is configured for each access command based on at least one of a current radial location of the corresponding head or a target radial location of the corresponding head associated with executing the access command (block 26). The access commands are sorted based on the scalars (block 28), and one of the access commands is selected for execution based on the sort (block 30).

Figure 1:
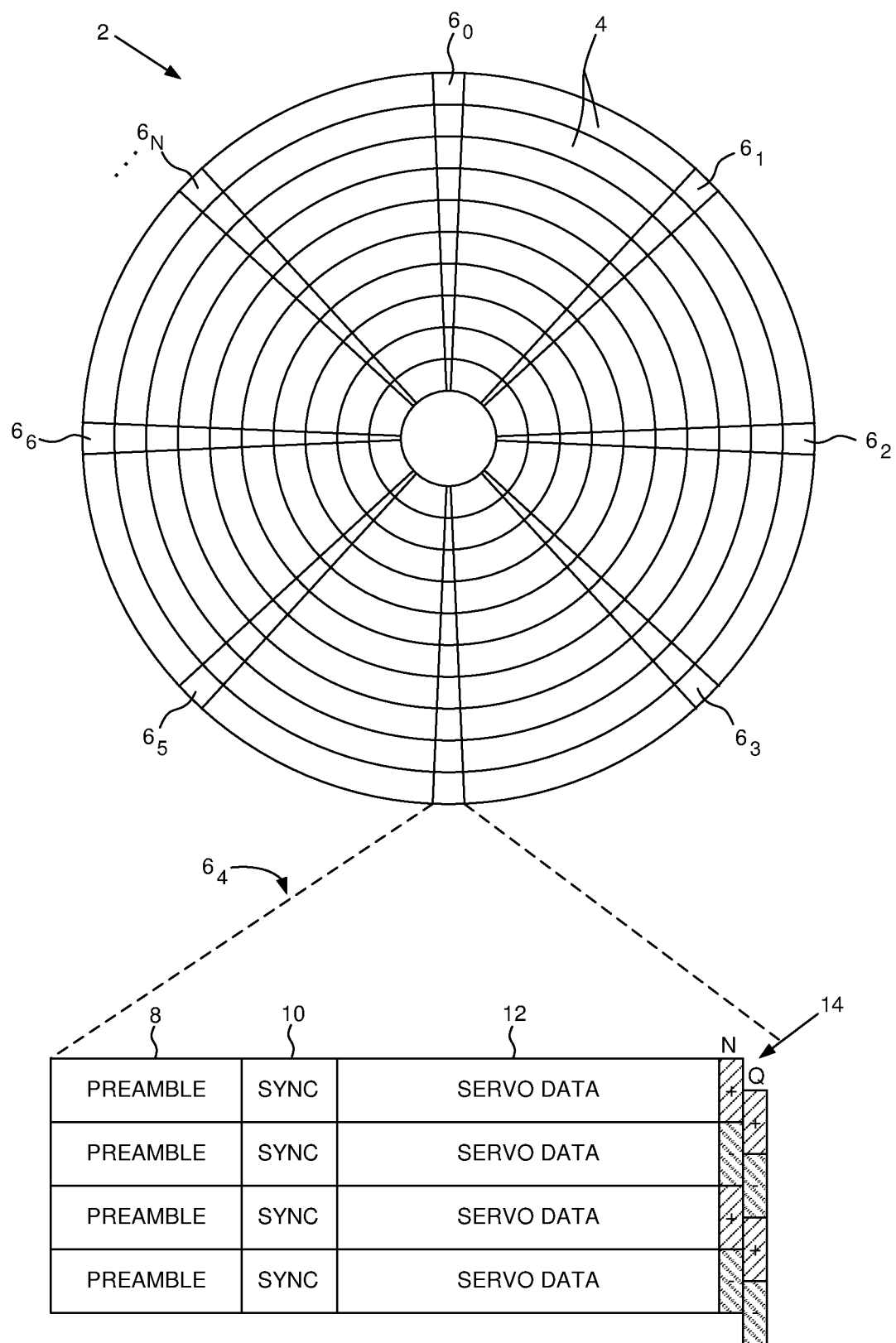
FIG. 1 shows a prior art disk format comprising a plurality of servo tracks defined by servo sectors.

In the embodiment of FIG. 2A, each disk surface (e.g., 16A) comprises a plurality of servo sectors $32_1$-$32_N$ that define a plurality of servo tracks 34, wherein data tracks are defined relative to the servo tracks at the same or different radial density. The control circuitry 22 processes a read signal 36 emanating from the head to demodulate the servo sectors and generate a position error signal (PES) representing an error between the actual position of the head and a target position relative to a target track. A servo control system in the control circuitry 22 filters the PES using a suitable compensation filter to generate a control signal 38 applied to a coarse actuator (e.g., VCM 20A) which rotates an actuator arm (e.g., 40A) about a pivot in order to actuate the corresponding heads radially over the disk surfaces in a direction that reduces the PES. The heads may also be servoed using a fine actuator, such as a piezoelectric (PZT) actuator, configured to actuate a suspension relative to the actuator arm, and/or configured to actuate the head relative to the suspension. The servo sectors $32_1$-$32_N$ may comprise any suitable head position information, such as a track address for coarse positioning and servo bursts for fine positioning. The servo bursts may comprise any suitable pattern, such as an amplitude based servo pattern or a phase based servo pattern (FIG. 1).

In the embodiment of FIG. 2B, the first and second VCMs 20A and 20B rotate the respective set of actuator arms (e.g., 40A and 40B) about a common pivot in what has been referred to as a split actuator design. In another embodiment, a first and second VCM may be configured to actuate a respective set of actuator arms about a separate pivot, for example, mounted at different circumferential locations about the disks. Other embodiments may employ more than two actuators, for example, an embodiment employing more than two actuators actuated about a common pivot or an embodiment employing multiple split actuators mounted at different circumferential locations about the disks.

In one embodiment, the pending access commands are stored in a command queue and sorted into an execution order that achieves any suitable performance criteria, such as minimizing the overall access time, optimizing power consumption, minimizing average and/or tail latency, etc. In one embodiment, the control circuitry 22 executes the access commands serially meaning that only one of the VCMs 20A or 20B may be active (seeking or tracking) while executing a current access command. Accordingly in one embodiment the control circuitry 22 sorts the access commands into an optimal execution order under the limitation that only one VCM is active at time. However when the heads corresponding to the first VCM 20A are near an outer or inner diameter of the corresponding disk surfaces, and the heads corresponding to the second VCM 20B are near a middle diameter of the corresponding disk surfaces, the sort algorithm may end up significantly delaying or even "locking out" the access commands serviced by the first VCM 20A, thereby increasing the average and/or tail latency of these access commands. One reason for the increased latency may be due to the increase in the average seek length when the current radial location of the heads is near the outer or inner diameter of the disk surfaces, where the increased seek length and attendant increased seek time pushes the accesses commands further down the sort order (i.e., reduces the probability of selecting the access command for execution). Accordingly in one embodiment the sort algorithm is modified so as to bias the sorting weighting of each access command based on at least one of a current radial location or target radial location of the corresponding head.

Figure 3A:
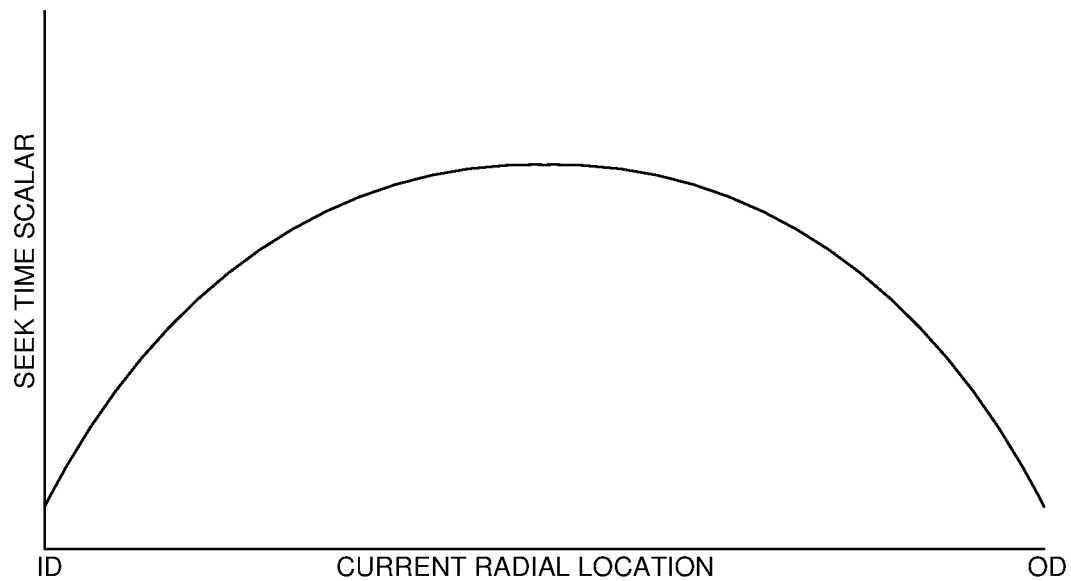
FIG. 3A shows an embodiment wherein a scalar for scaling a seek time of an access command decreases as a current radial location of the head nears an inner diameter or outer diameter of the disk surface.

FIG. 3A shows an example embodiment wherein the control circuitry 22 configures a scalar for each access command used to scale the seek time based on the current radial location of the corresponding head. As the current radial location of the head nears the outer diameter or the inner diameter of the disk surface, the scalar decreases so as to reduce the computed seek time for the access command, thereby increasing the probability that the access command will be selected for execution by the sort algorithm. That is, the scalar increases the weighting of the access command when the head is near the outer/inner diameter of the disk surface in order to reduce the selection delay that may otherwise manifest due to the increase in the average seek length.

Figure 3B:
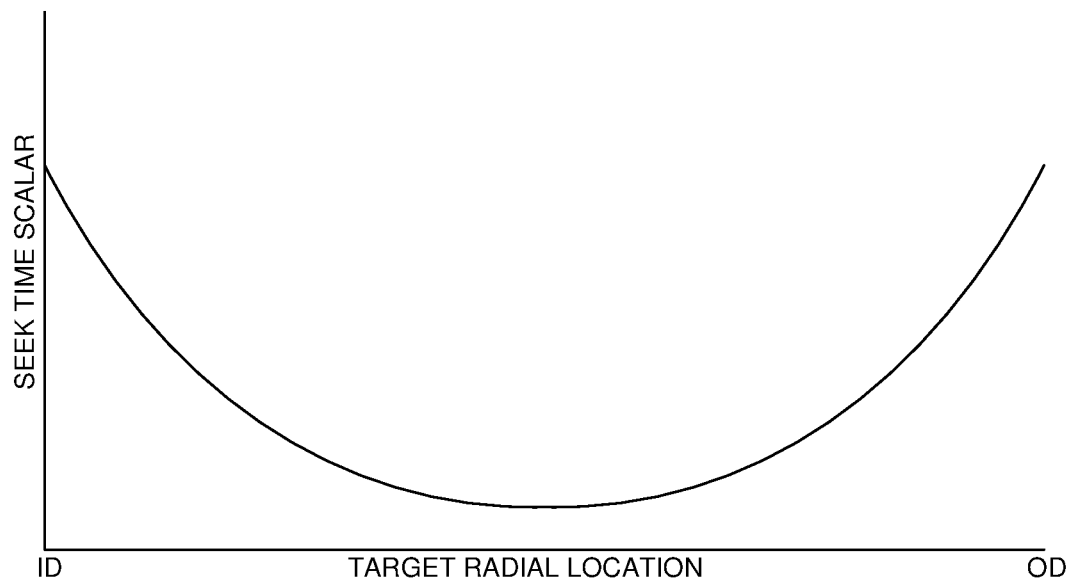
FIG. 3B shows an embodiment wherein a scalar for scaling a seek time of an access command increases as a target radial location of the head nears an inner diameter or outer diameter of the disk surface.

FIG. 3B shows another embodiment wherein the control circuitry 22 configures a scalar for each access command used to scale the seek time based on the target radial location of the corresponding head. As the target radial location of the head nears the outer diameter or inner diameter of the disk surface, the scalar increases so as to reduce the computed seek time for the access command, thereby decreasing the probability that the access command will be selected for execution by the sort algorithm. That is, the scalar decreases the weighting of the access command when the target radial location of the head is near the outer/inner diameter of the disk surface in order to reduce the probability that the heads will end up near the outer/inner diameter of the disk surfaces. In one embodiment the control circuitry 22 may scale the seek time of each access command using a first scalar corresponding to the current radial location of the head (FIG. 3A) in combination with a second scalar corresponding to the target radial location of the head (FIG. 3B).

Figure 4A:
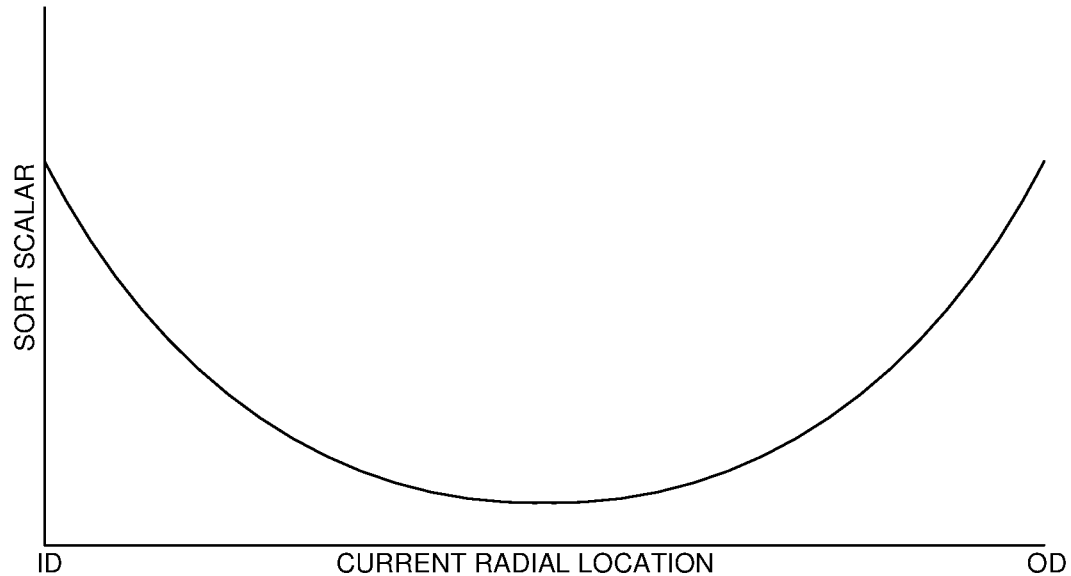
FIG. 4A shows an embodiment wherein a scalar for scaling a probability of selecting an access command increases as a current radial location of the head nears an inner diameter or outer diameter of the disk surface.
Figure 4B:
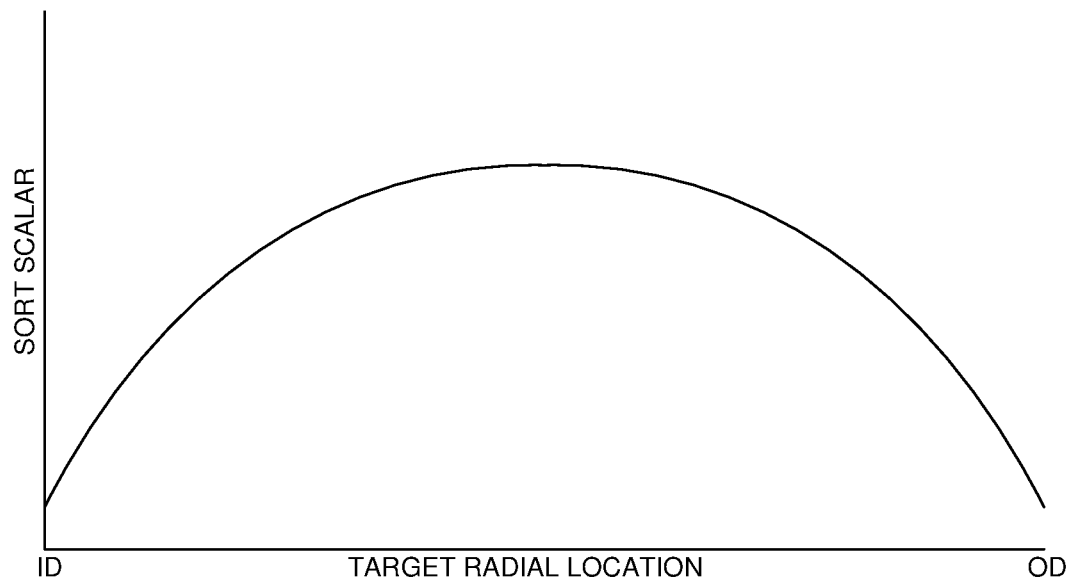
FIG. 4B shows an embodiment wherein a scalar for scaling a probability of selecting an access command decreases as a target radial location of the head nears an inner diameter or outer diameter of the disk surface.

In the embodiments of FIGS. 3A and 3B, the control circuitry 22 biases the sort algorithm by scaling the seek time of each access command based on at least one of the current radial location or the target radial location of the corresponding head. In other embodiments, the control circuitry 22 may bias the sorting algorithm in any suitable manner so as to increases a probability of selecting the access command when the current radial location of the corresponding head is near an inner diameter or an outer diameter of the disk surface. For example in an embodiment shown in FIG. 4A, the control circuitry 22 may use a general sort scalar that biases a weighting of each access command in the sort algorithm, wherein the sort scalar increases as the current radial location of the head nears the outer/inner diameter of the disk surface, thereby increasing the probability that the access command will be selected for execution. For example, the sort algorithm may compute an unbiased weighting for an access command based on any suitable metric (e.g., seek time, power consumption, execution latency, etc.), and then bias the weighting using the sort scalar. In a similar embodiment shown in FIG. 4B, the control circuitry 22 may use a general sort scalar that decreases as the target radial location of the head nears the outer/inner diameter of the disk surface, thereby decreasing the probability that the access command will be selected for execution. Similar to the embodiment described above, the control circuitry 22 may use a first sort scalar for scaling the sort weighting based on the current radial location of the head in combination with a second sort scalar for scaling the sort weighting based on the target radial location of the head.

In one embodiment the control circuitry 22 may configure the scalar for each access command to unity when all of the access commands correspond to one of the first subset of the disk surfaces or the second subset of disk surfaces. That is when only one of the VCMs is needed to service all of the pending access commands, there may be no benefit to scaling the sort weighting based on the current radial location or the target radial location of the head. In this embodiment, the sort algorithm effectively reverts to a conventional sort algorithm for sorting the access commands in a disk drive comprising a single VCM (i.e., without biasing the sort weighting based on the current or target radial location of the heads).

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, an optical disk drive, a hybrid disk drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
a plurality of disk surfaces;
a first plurality of heads actuated over a first subset of the disk surfaces by a first actuator;
a second plurality of heads actuated over a second subset of the disk surfaces by a second actuator; and
control circuitry configured to:
    receive a plurality of access commands, wherein each access command is associated with one of the heads;
    configure a scalar for each access command based on at least one of a current radial location of the corresponding head or a target radial location of the corresponding head associated with executing the access command;
    sort the access commands based on the scalars; and
    select one of the access commands for execution based on the sort.

2. The data storage device as recited in claim 1, wherein the control circuitry configures executes the access commands serially.

3. The data storage device as recited in claim 1, wherein the scalar increases a probability of selecting the access command when the current location of the corresponding head is near an inner diameter or an outer diameter of the disk surface.

4. The data storage device as recited in claim 1, wherein the scalar decreases a probability of selecting the access command when the target location of the corresponding head is near an inner diameter or an outer diameter of the disk surface.

5. The data storage device as recited in claim 3, wherein the control circuitry is further configured to:
    generate a seek time associate with each access command; and
    scale the seek time based on the scalar, wherein the scalar decreases as the current location of the corresponding head nears an inner diameter or an outer diameter of the disk surface.

6. The data storage device as recited in claim 4, wherein the control circuitry is further configured to:
    generate a seek time associate with each access command; and
    scale the seek time based on the scalar, wherein the scalar increases as the target location of the corresponding head nears an inner diameter or an outer diameter of the disk surface.

7. The data storage device as recited in claim 3, wherein:
    the scalar represents a probability of selecting the access command for execution; and
    the scalar increases as the current location of the corresponding head nears an inner diameter or an outer diameter of the disk surface.

8. The data storage device as recited in claim 4, wherein:
    the scalar represents a probability of selecting the access command for execution; and
    the scalar decreases as the target location of the corresponding head nears an inner diameter or outer diameter of the disk surface.

9. The data storage device as recited in claim 1, wherein the control circuitry configures the scalar for each access command to unity when all of the access commands correspond to one of the first subset of the disk surfaces or the second subset of disk surfaces.

10. A data storage device comprising:
a plurality of disk surfaces;
a first plurality of heads actuated over a first subset of the disk surfaces by a first actuator;
a second plurality of heads actuated over a second subset of the disk surfaces by a second actuator; and
control circuitry configured to:
    receive a plurality of access commands, wherein each access command is associated with one of the heads;
    sort the access commands based on at least one of a current radial location of the corresponding head or a target radial location of the corresponding head associated with executing the access command; and
    select one of the access commands for execution based on the sort.

11. The data storage device as recited in claim 10, wherein the control circuitry configures executes the access commands serially.

12. The data storage device as recited in claim 10, wherein the control circuitry is further configured to sort the access commands by increasing a probability of selecting one of the access commands when the current location of the corresponding head is near an inner diameter or an outer diameter of the disk surface.

13. The data storage device as recited in claim 10, wherein the control circuitry is further configured to sort the access commands by decreasing a probability of selecting the access command when the target location of the corresponding head is near an inner diameter or an outer diameter of the disk surface.

14. The data storage device as recited in claim 12, wherein the control circuitry is further configured to:
   generate a seek time associate with each access command; and
   scale the seek time based on a scalar, wherein the scalar decreases as the current location of the corresponding head nears an inner diameter or an outer diameter of the disk surface.

15. The data storage device as recited in claim 13, wherein the control circuitry is further configured to:
   generate a seek time associate with each access command; and
   scale the seek time based on a scalar, wherein the scalar increases as the target location of the corresponding head nears an inner diameter or an outer diameter of the disk surface.

16. The data storage device as recited in claim 10, wherein the control circuitry is further configured to sort the access commands based on at least one of the current radial location of the corresponding head or the target radial location of the corresponding head when at least one of the access commands corresponds to one of the first subset of the disk surfaces and at least one of the access commands corresponds to one of the second subset of disk surfaces.

17. A data storage device comprising:
   a plurality of disk surfaces;
   a first plurality of heads actuated over a first subset of the disk surfaces by a first actuator;
   a second plurality of heads actuated over a second subset of the disk surfaces by a second actuator; and
   a means for receiving a plurality of access commands, wherein each access command is associated with one of the heads;
   a means for sorting the access commands based on at least one of a current radial location of the corresponding head or a target radial location of the corresponding head associated with executing the access command; and
   a means for selecting one of the access commands for execution based on the sort.

18. The data storage device as recited in claim 17, further comprising a means for executing the access commands serially.

19. The data storage device as recited in claim 17, wherein the means for sorting the access commands comprises a means for increasing a probability of selecting one of the access commands when the current location of the corresponding head is near an inner diameter or an outer diameter of the disk surface.

20. The data storage device as recited in claim 15, wherein the means for sorting the access commands comprises a means for decreasing a probability of selecting the access command when the target location of the corresponding head is near an inner diameter or an outer diameter of the disk surface.

* * * * *